United States Patent [19]
Chih

[11] Patent Number: 5,544,791
[45] Date of Patent: Aug. 13, 1996

[54] GREASE PUMPING ASSEMBLY

[76] Inventor: Chen-keng Chih, 6F-2, No. 57, Hsuehfu Rd., Taichung, Taiwan

[21] Appl. No.: 553,147

[22] Filed: Nov. 7, 1995

[51] Int. Cl.⁶ .............................................. G01F 11/00
[52] U.S. Cl. ........................ 222/262; 222/333; 222/608; 417/234; 417/549
[58] Field of Search ........................ 417/63, 234, 415, 417/549, 569; 222/262, 333, 608; 184/46

[56]  References Cited

U.S. PATENT DOCUMENTS

| | | | |
|---|---|---|---|
| 1,806,615 | 5/1931 | Davis | 222/262 |
| 1,858,155 | 5/1932 | Harris | 222/262 |
| 1,871,291 | 8/1932 | Adams et al. | 222/333 |
| 1,975,311 | 10/1934 | Creveling | 222/262 |
| 2,010,165 | 8/1935 | Tear | 222/333 |
| 2,012,782 | 2/1935 | Arnold | 417/234 |

Primary Examiner—Charles Freay
Assistant Examiner—Roland G. McAndrews, Jr.
Attorney, Agent, or Firm—Welsh & Katz, Ltd.

[57] ABSTRACT

A grease pumping assembly includes a drum for receiving grease therein, the drum has a central hole defined in a bottom thereof and is disposed to a base, the base having a first recess, a second recess and a second hole defined therein, the first recess communicating with the central hole of the drum and a motor disposed with the second recess, a first hole defined in the base and communicating with the first recess, a bottom plate disposed to a bottom of the base and the bottom plate having a reduction device disposed therein which is engaged to the motor and the reduction device having an eccentric rod inserted into the second hole of the base for being engaged to a pushing rod, the pushing rod movably disposed between the second hole and the first recess such that the grease drops into the first recess via the central hole of the drum and is pumped by the pushing rod through a first hole defined in the base to a grease gun.

6 Claims, 7 Drawing Sheets

5,544,791

GREASE PUMPING ASSEMBLY

BACKGROUND OF THE INVENTION

The present invention relates to a grease pumping assembly and more particularly to a grease pumping assembly which pumps grease received in a drum completely.

FIG. 1 shows a conventional grease pumping assembly which includes a drum 80 for receiving grease therein, a cart 81 on which the drum 80 is disposed, a cover 82 mounted to the drum 80 so as to prevent dirt from entering in the drum 80. A pipe 84 extends through an opening defined in the drum 80 and has one end inserted into the grease, a second end of the pipe 84 extending to the cover 82 and being connected to a pump 83 from which a duct 85 is connected so as to pump the grease by the pump 83 via the pipe 84 and the duct 85 to a grease gun 86. However, because of the viscosity of grease, only the grease located near the pipe 84 tends to be sucked via the pipe 84 such that there will be an empty area 87 defined in the grease around the pipe 84 after pumping for a period of time, as shown in the figure. Therefore, there will be no grease be pumped out from the grease gun 86 even though there is a lot of grease remaining in the drum 80. Generally, the user knocks the drum 80 or shakes the drum 80 to let the remaining grease move into the empty portion 87 so as to be sucked again, but this action is deemed to consume too much time.

The present invention intends to provide an improved grease pumping assembly which has a pump and a pushing rod to effectively and completely pump grease in the drum so as to mitigate and/or obviate the above-mentioned problems.

SUMMARY OF THE INVENTION

The present invention provides a grease pumping assembly which includes a drum for receiving grease therein, the drum has a central hole defined in a bottom thereof and is disposed to a base. The base has a first recess, a second recess and a second hole defined therein, the first recess communicating with the central hole of the drum and a motor being disposed with the second recess, a first hole defined in the base and communicating with the first recess. A bottom plate is disposed to a bottom of the base has a reduction means disposed therein which is engaged to the motor. The reduction means has an eccentric rod which is inserted into the second hole of the base for being engaged to a pushing rod. The pushing rod is movably disposed between the second hole and the first recess such that the grease drops into the first recess via the central hole of the drum and is pumped by the pushing rod through a first hole defined in the base to a grease gun.

It is an object of the present invention to provide a grease pumping assembly which effectively pumps all the grease in a drum by a pushing rod and a motor to a grease gun.

Other objects, advantages, and novel features of the invention will become more apparent from the following detailed description when taken in conjunction with the accompanying drawings.

DETAILED DESCRIPTION OF THE PREFERRED EMBODIMENTS

Figure 2:
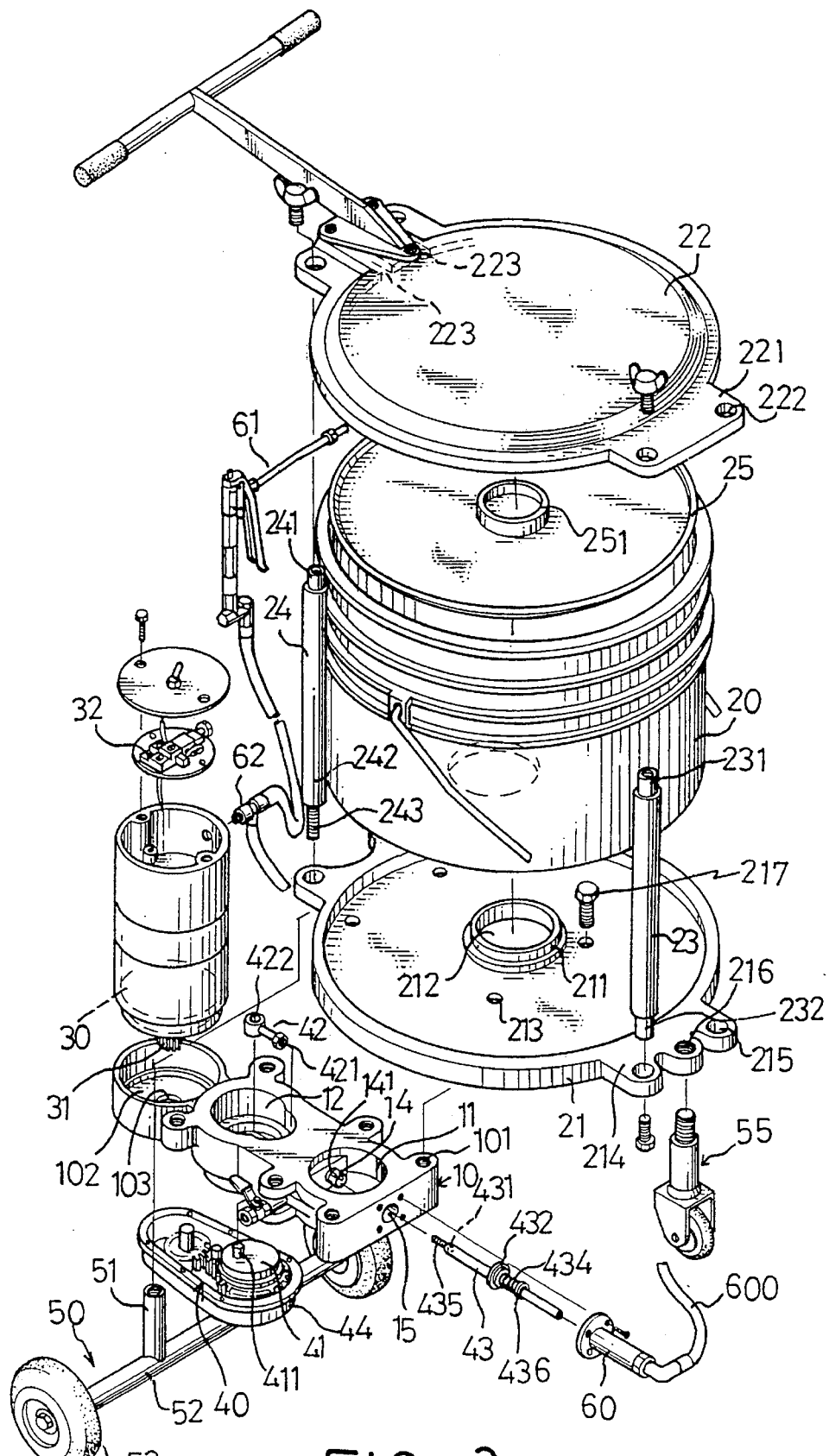
FIG. 2 is an exploded view of a grease pumping assembly in accordance with the present invention.
Figure 3:
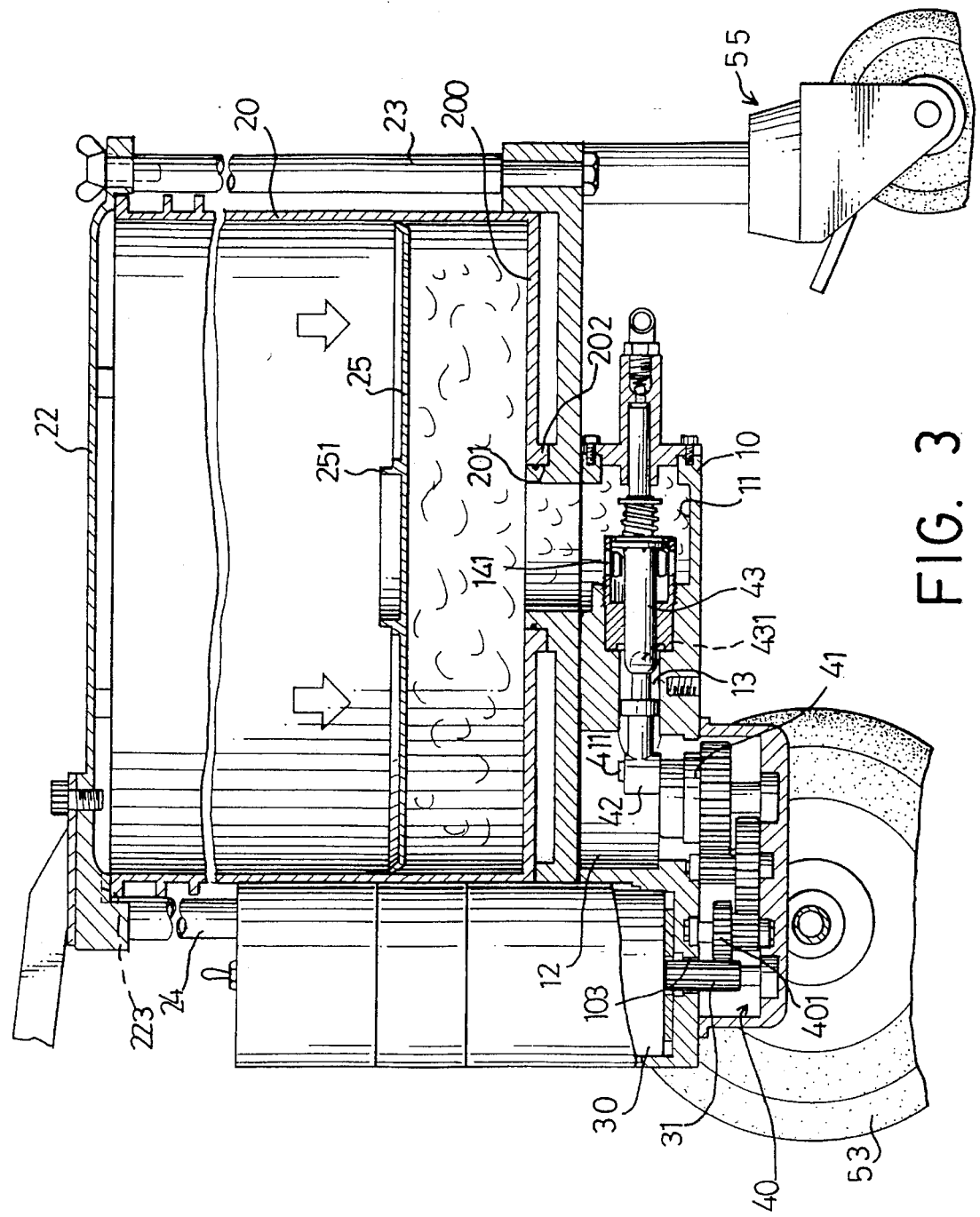
FIG. 3 is a side elevational view, partly in section, of the grease pumping assembly in accordance with the present invention.
Figure 4:
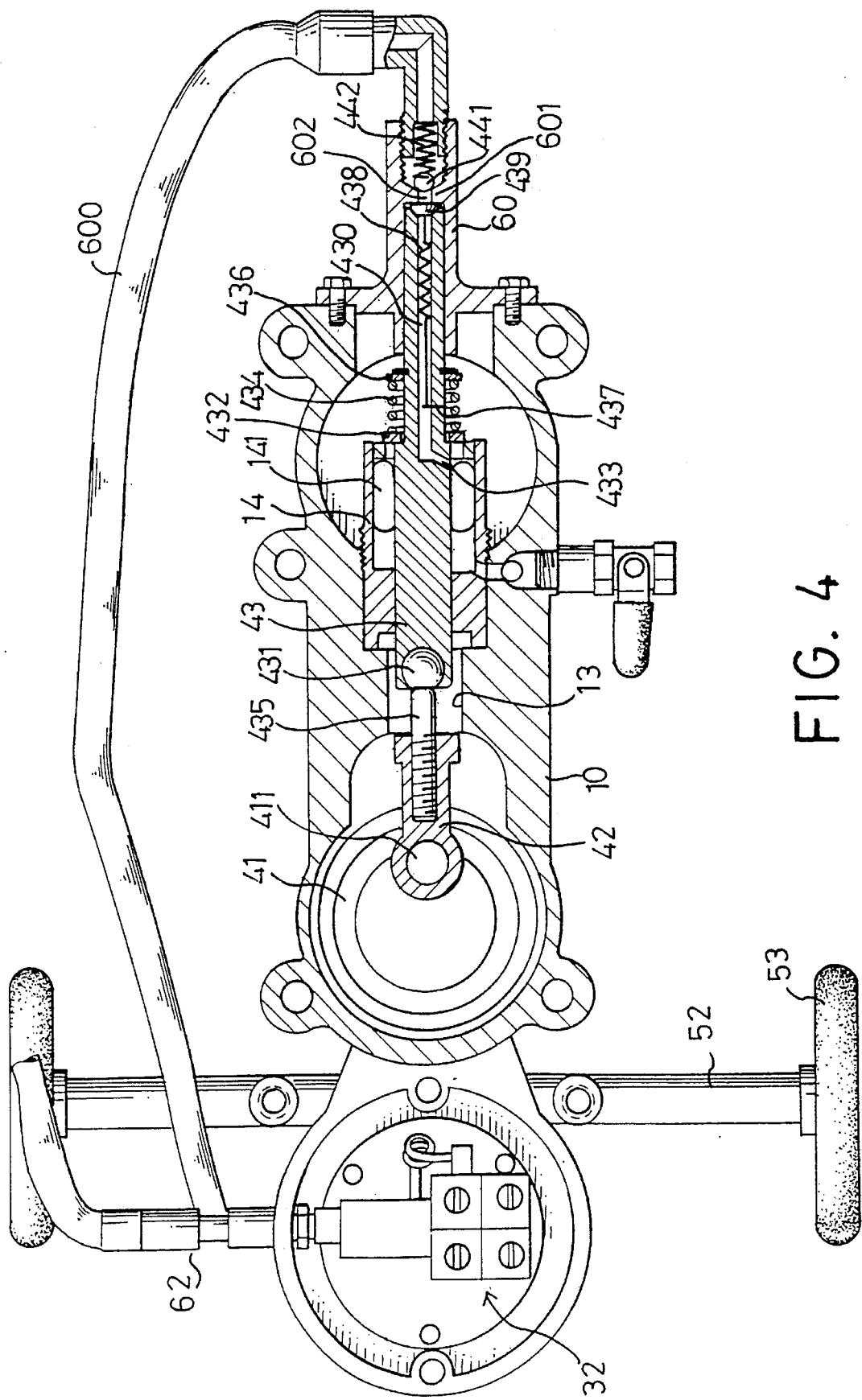
FIG. 4 is a top plane view of an engagement between a base, a pushing rod disposed in the base and a pipe connected to the base wherein the pushing rod is not actuated.

Referring to the drawings and initially to FIGS. 2 through 4, a grease pumping assembly in accordance with the present invention generally includes a drum 20 having an open top and a bottom 200, the bottom 200 having a first central hole 201 defined therein.

A base 10 has a first end and a second end, the first end thereof having a first recess 11 defined in an upper portion thereof and a first hole 15 defined transversely therein which communicates with the first recess 11, the second end thereof having a second recess 102 defined in the upper portion thereof, a second hole 12 defined in the base 10 and located between the first and the second recesses 11, 102. A communicating passage 13 (FIG. 3) is defined in the base 10 and communicates with the first recess 11 and the second hole 12, a bottom defining the second recess 102 having a third hole 103 defined therein. A tubular element 14 threadedly engages with an inner periphery defining the communicating passage 13 and extends over a section of the tubular element 14 into the first recess 11, a plurality of apertures 141 are defined in the section of the tubular element 14.

A bottom plate 44 has a first end and a second end, the bottom plate 44 disposed to an under side of the base 10, the first end thereof having a reduction means 40 disposed therein which has a top plate 41 disposed thereto from which an eccentric rod 411 extends upwardly and the eccentric rod 411 extends into the second hole 12 of the base 10. The reduction means 40 has a gear 401 disposed near the second end of the bottom plate 44.

A motor 30 has a first end and a second end, the first end thereof having a pressure detecting means 32 disposed thereto, the second end thereof having a pinion 31 rotatably extending therefrom, the pinion engaged to the gear 401.

A connector 42 has a first end and a second end, the first end thereof having a socket 421 and the second end thereof having a ring 422 for receiving the eccentric rod 411 therein.

Referring to FIG. 4, a pushing rod 43 has a first end and a second end and extends through the communicating passage 13 and the tubular element 14, a central passage 430 defined longitudinally in the pushing rod 43 and extending through the first end of the pushing rod 43, an inclined passage 433 defined radially in the pushing rod 43 and the inclined passage 433 communicating with the central passage 430. A first stop 432 and a second stop 436 are respectively securely engaged to the pushing rod 43 and a first spring 434 is mounted to the pushing rod 43 and located between the first and the second stops 432, 436. A conic element 439 is engaged with the first end of the pushing rod 43 and movably seals the central passage 430. A second spring 438 is disposed in the central passage 430 and is connected to the conic element 439 by a first end thereof, a second end of the second spring 438 being secured to a pin 437 which extends radially in the central passage 430. The second end of the pushing rod 43 is engaged to a threaded rod 435, the threaded rod 435 having one end with a ball 431 which is rotatably engaged to the second end of the pushing rod 43 and the threaded rod 435 threadedly engaged to the socket 421 of the connector 42.

An extending tube 60 is fixedly connected to the first end of the base 10 and communicates with the first hole 15 of the base 10. A pipe 600 has a first end connected to a distal end of the extending tube 60 and a second end connected to a grease gun 61. An adaptor 62 is disposed at a mediate portion of the pipe 600 and connects to the pressure detecting means 32 disposed to the motor 30. The first end of the pipe 600 has a neck portion 601 extending radially from an inner periphery thereof and the neck portion 601 defines an aperture 602 in a center of the neck portion 601. The aperture 602 is sealed by a ball 441 which is biased by a spring 442 securely disposed in the pipe 600 so as to prevent the grease from flowing back into the first recess 11 of the base 10.

A cover 22 is mounted to the drum 20 to close the open top of the drum 20, the cover 22 having two vents 223 defined therein which communicate which an interior of the drum 22 with the atmosphere, and the cover 22 having at least two first lugs 221 extending radially from a periphery thereof. Each one of the first lugs 221 has two fourth holes 222 defined therein. A support disk 21 is disposed between the drum 20 and the base 10 and the support disk 21 is engaged to the base 10 by threadedly engaging bolts 217 through holes 213 defined in the support disk 21 and extending through a plurality of holes 101 defined in the base 10. The support disk 21 has a second central hole 212 defined in a center thereof which communicates with the first central hole 201 and has two second lugs 214 extending radially from a periphery thereof and each one of the second lugs 214 has two fifth holes 215 defined therein which are in alignment with the fourth holes 222. A first column 23 and two second columns 24 each respectively have first extending ends 231, 241, each of the first extending ends 231, 241 of the first and the second columns 23, 24 having a smaller diameter than that of the first and the second columns 23, 24. The first column 231 has a second extending end 232 in which a threaded recess is defined longitudinally therein such that the first column 23 is connected between the cover 22 and the support disk 21 by inserting each of the first and second extending ends 231, 232 into the corresponding fourth hole 221 and the fifth hole 215 respectively and threadedly engaging a bolt into each one of the threaded recesses of the first column 23. Each of the second columns 24 has a threaded recess defined in the first extending end 241 thereof which extends through the corresponding first lug 221 of the cover 22 and has a threaded portion 243 defined in a periphery of a second threaded extending end 242 which extends through the corresponding second lug 214.

One of the two second lugs 214 has a threaded hole 216 defined therein for a front wheel set 55 being threadedly engaged thereto, the threaded portion 243 of the second column 24 threadedly engaged to a rear wheel frame 50 after extending through the second lug 214. The rear wheel frame 50 has an axle 52 with a wheel 53 disposed to each one of two ends thereof and two tubes 51 extend upwardly from the axle 52, each of the tubes 51 having a threaded recess defined in a top thereof for threadedly receiving the threaded portion 243 of the corresponding second column 24 therein.

Figure 1:
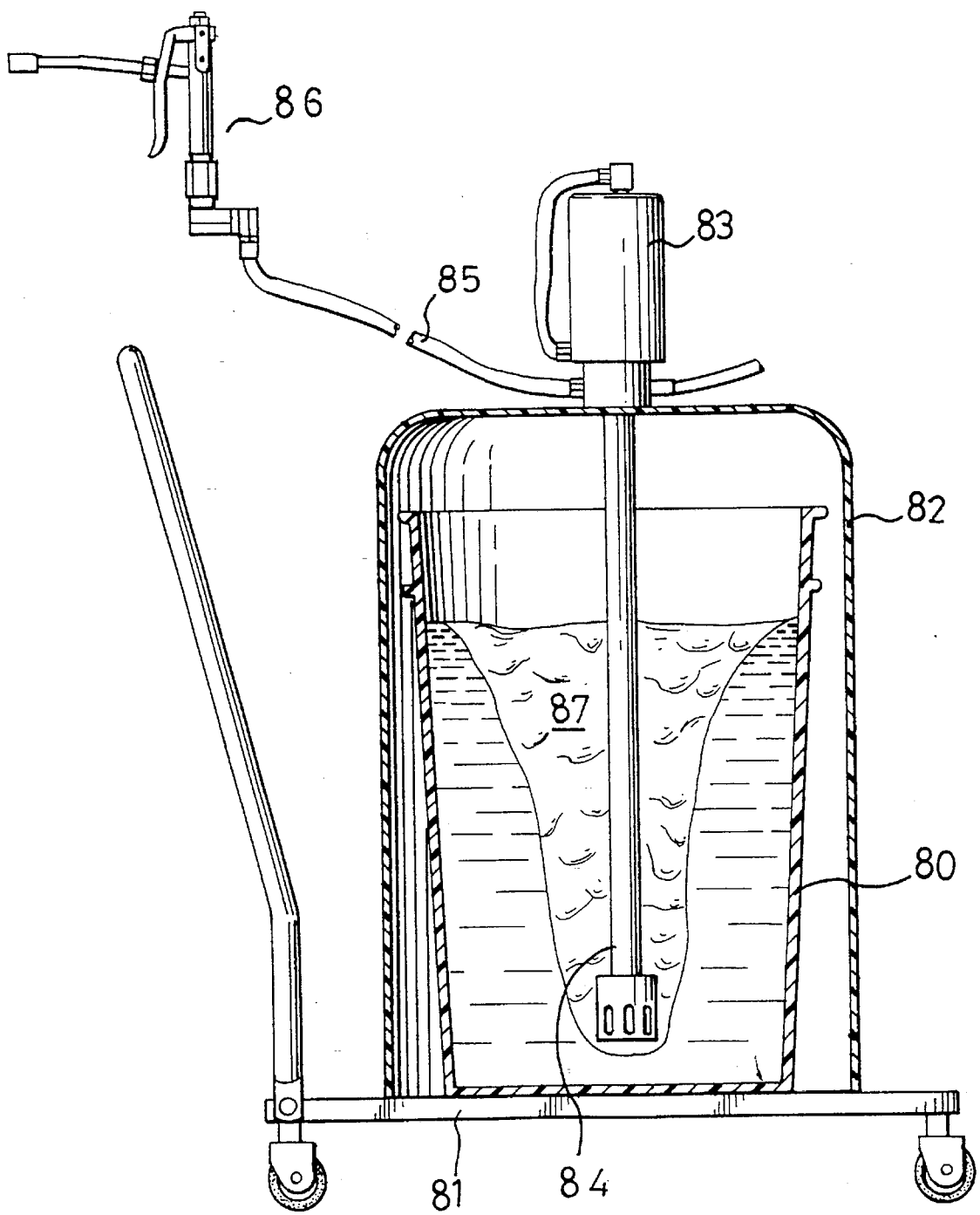
FIG. 1 is a side elevational view, partly in section, of a conventional grease pumping assembly.

A pressing plate 25 is disposed in the drum 20 to press the grease in the drum 20 such that there will be no empty portion as shown in FIG. 1. The drum 20 is disposed to the base 10 and the first central hole 201 communicates with the first recess 11 such that the grease in the drum 20 drops into the first recess 11 from the drum 20.

Figure 5:
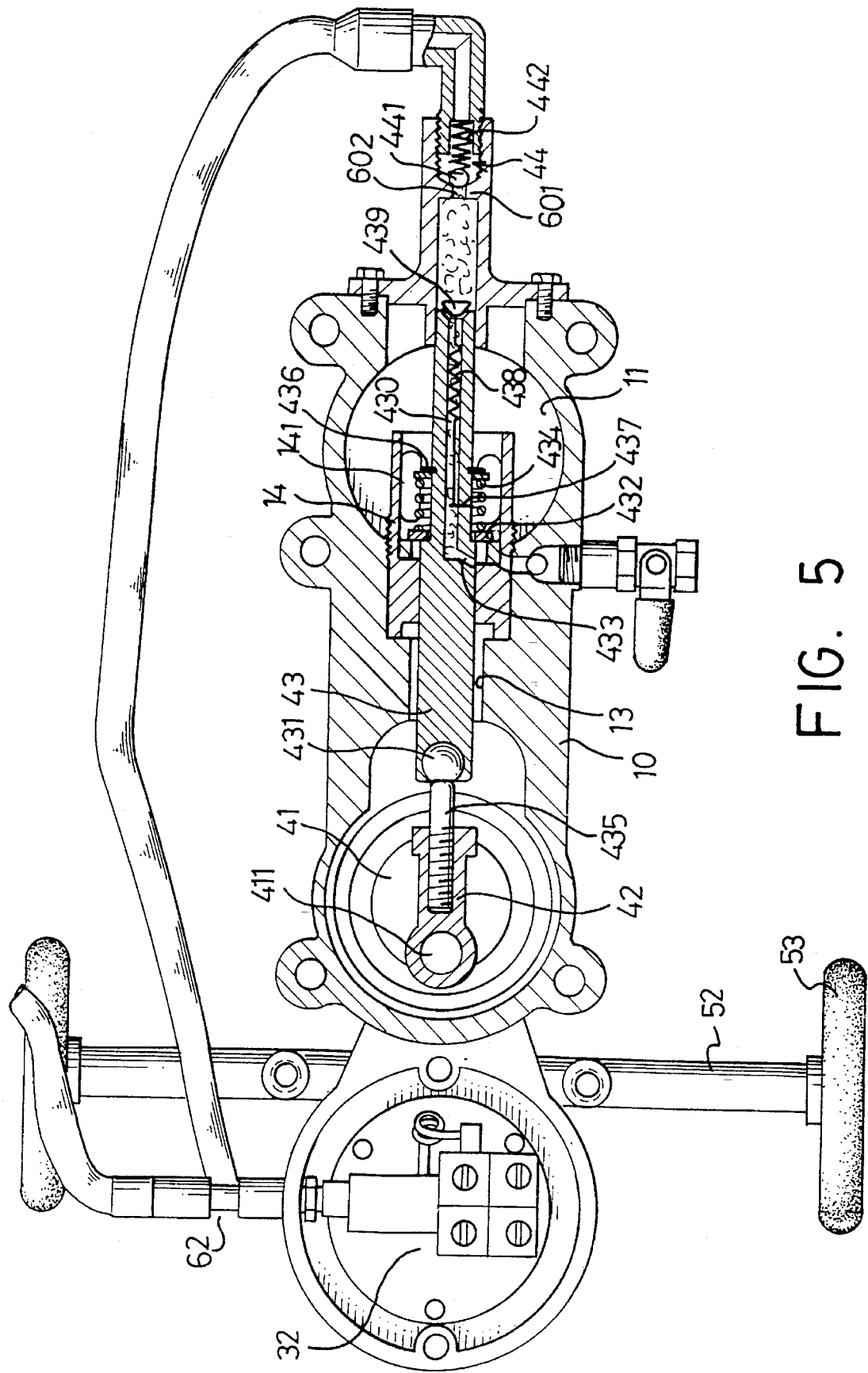
FIG. 5 is a view similar to FIG. 3 which shows the pushing rod is pulled and the grease is going to be pumped by the pushing rod.

Referring to FIG. 5, when the motor 30 is actuated, the pinion 31 of the motor 30 is rotated to rotate the top plate 41 via the reduction means 40, the eccentric rod 411 being rotated with the top plate 41 and to reciprocatingly move the pushing rod 43 within the communicating passage 13. When the pushing rod 43 is moved toward the second end of the base 10, the first stop 432 contacts against an inner periphery of the first recess 11 and the first spring 434 is compressed, in the mean time, the grease enters into the inclined passage 433 and the central passage 430, and the conic element 439 is pushed to extend the second spring 438 and the grease enters into the extending tube 60 via a clearance defined between the conic element 439 and an inner periphery of the pushing rod 43. When the pushing rod 43 is moved toward the first end of the base 10, the grease in the extending tube 60 is pushed to push the ball 441 away from the aperture 602 so as to be transferred to the grease gun 61 via the pipe 600 and the adapter 62. When use of the grease gun 61 ceases, the grease is then pushed into the pressure detection means 32 which stops the motor 30 when a certain pressure is detected by the pressure detection means 32.

Because there is a pressing plate 25 disposed in the drum 20 and the cover 22 has two vents 223, the pressing plate 25 pushes the grease uniformly until all of the grease in the drum 20 drops into the first recess 11.

Figure 6:
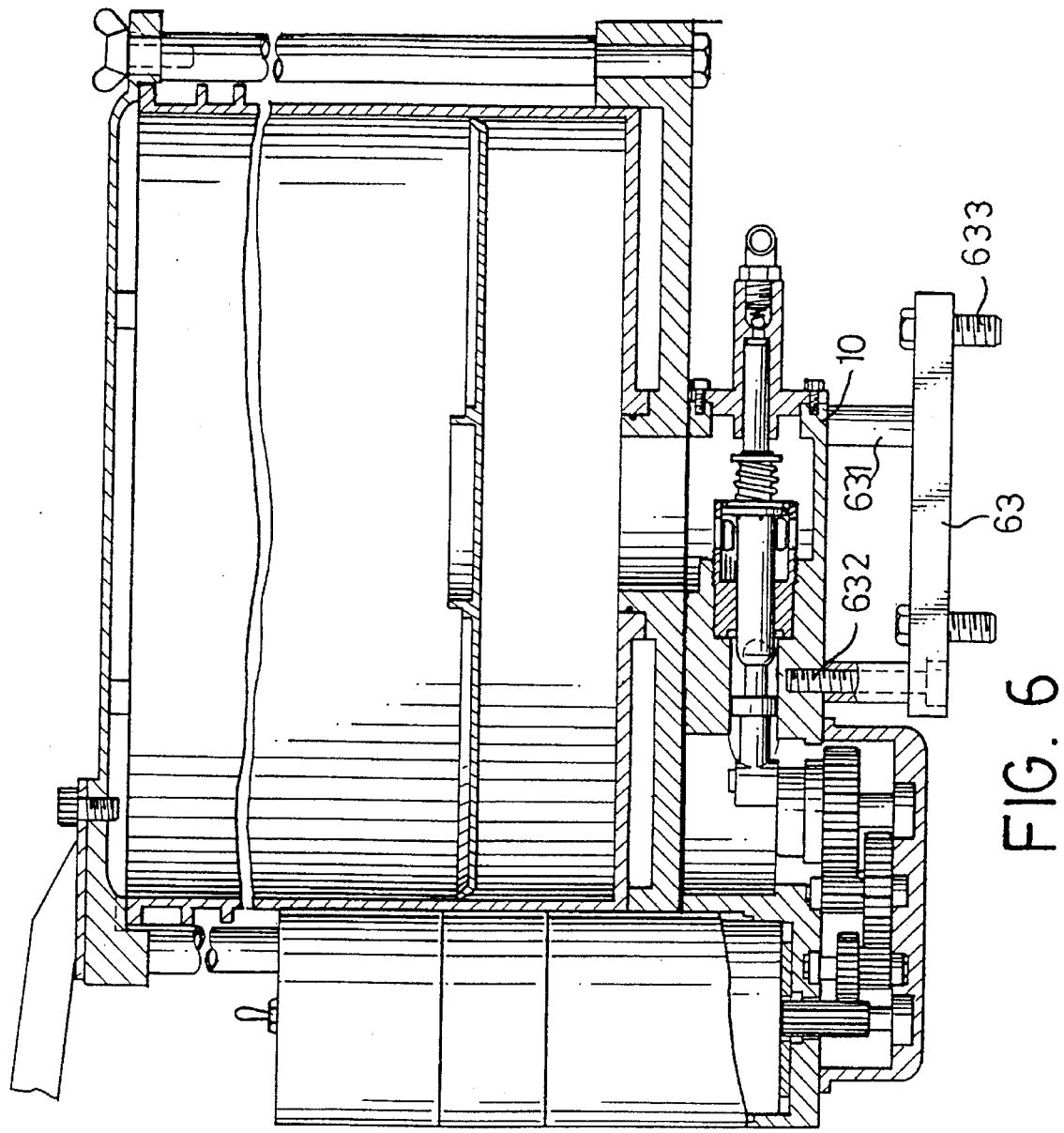
FIG. 6 is a side elevational view, partly in section, of another embodiment of the present invention.

Referring to FIG. 6, the present invention can be disposed to a fixed plate 63 which has at least two threaded studs 631 extending upwardly therefrom for bolts 632 threadedly engaged to an under side of the base 10 and the fixed plate 63 is fixedly engaged to a desired object (not shown) by bolts 633 being engaged through the fixed plate 63.

Figure 7:
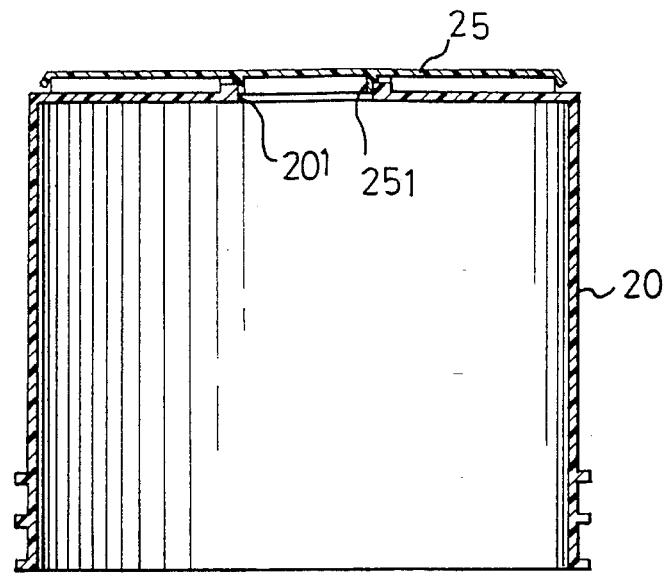
FIG. 7 is a side elevational view, partly in section, of a used drum of the present invention to be used as a stool.
Figure 8:
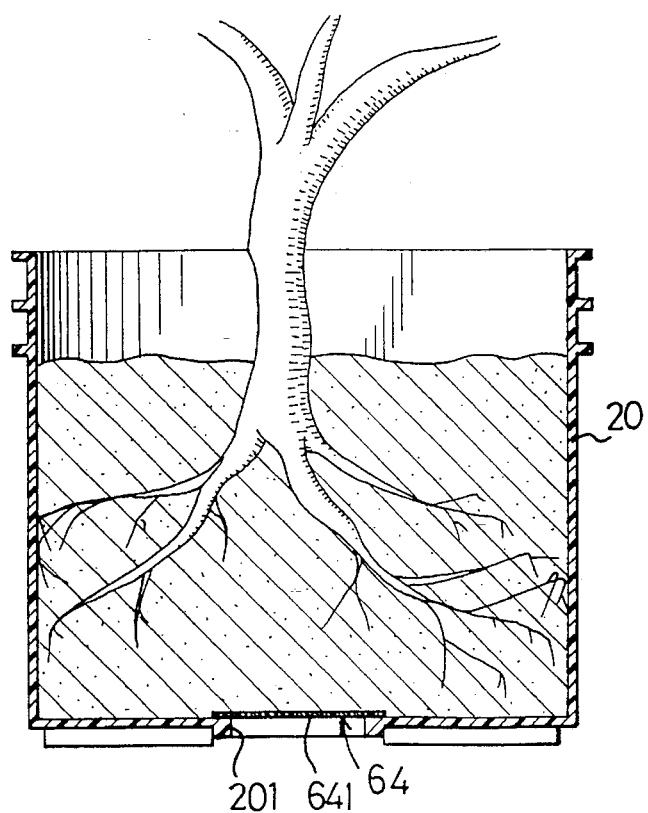
FIG. 8 is a side elevational view, partly in section, of the used drum to be used as a flowerpot.

Referring to FIGS. 2, 7 and 8, the support disk 21 has a second flange 211 extending therefrom and the second flange 211 defines the second central hole 212, the bottom 200 having a third flange 202 (FIG. 3) extending therefrom and the third flange 202 defining the first central hole 201 such that the second flange 211 is engaged with the first central hole 201 and is received in an inner periphery of the third flange 202. The pressing plate 25 has a hole defined therein and a first flange 251 extends from the pressing plate 25 and the first flange 251 defines the hole. When the grease in the drum 20 is used up, the drum 20 can be used as a stool as shown in FIG. 7 wherein the drum 20 is disposed upside down and the first flange 251 of the pressing plate 25 engaged with the first central hole 201. The drum 20 also can be used as a flowerpot as shown in FIG. 8, wherein a plate 64 with mesh 641 defined therein is disposed to close the first central hole 201.

Although the invention has been explained in relation to its preferred embodiment, it is to be understood that many other possible modifications and variations can be made without departing from the spirit and scope of the invention as hereinafter claimed.

What is claimed is:

1. A grease pumping assembly comprising:

a drum having an open top and a bottom, the bottom having a first central hole defined therein;

a base having a first end and a second end, said first end thereof having a first recess defined in an upper portion thereof and a first hole defined transversely therein which communicates with said first recess, said second end thereof having a second recess defined in said upper portion thereof and a second hole defined in said base and located between said first and said second recesses, a communicating passage defined in said base and communicating with said first recess and said second hole, a bottom defining said second recess having a third hole defined therein;

a bottom plate having a first end and a second end, said bottom plate disposed to an under side of said base, said first end thereof having a reduction means disposed therein which has a top plate disposed thereto from which an eccentric rod extends upwardly and said eccentric rod extending into said second hole of said base, said reduction means having a gear disposed near said second end of said bottom plate, a motor having a first end and a second end, said second end thereof having a pinion rotatably extending therefrom, said pinion engaged to said gear;

a connector having a first end and a second end, said first end thereof having a socket and said second end thereof having a ring for receiving said eccentric rod therein;

a pushing rod having a first end and a second end and extending through said communicating passage, a central passage defined longitudinally in said pushing rod and extending through said first end of said pushing rod and an inclined passage defined radially in said pushing rod and said inclined passage communicating with said central passage, a first stop and a second stop respectively and securely engaged to said pushing rod and a first spring mounted to said pushing rod and located between said first and said second stops, a conic element engaged with said first end of said pushing rod and movably sealing said central passage, a second spring disposed in said central passage and connected to said conic element with one end of said second spring, the other end of said second spring being secured to a pin which extends radially in said central passage, said second end of said pushing rod engaged to a threaded rod, said threaded rod having one end with a ball which is rotatably engaged to said second end of said pushing rod and said threaded rod threadedly engaged to said socket of said connector, and a pipe having a first end connected to said first end of said base and communicating with said first hole of said base, a second end of said pipe connected to a grease gun;

said drum disposed to said base and said first central hole communicating with said first recess such that said grease dropping into said first recess from said drum and said pushing rod is moved reciprocatingly within said communicating passage by rotating said top plate so as to pump said grease to said grease gun via said pipe.

2. The grease pumping assembly as claimed in claim 1 wherein said motor has a pressure detecting means disposed to a first end thereof, said pressure detecting means connected to said pipe via an adapter connected between said pressure detecting means and said pipe.

3. The grease pumping assembly as claimed in claim 1 wherein an extending tube is fixedly connected to said first end of said base and communicates with said first hole of said base, said pipe engaged to a distal end of said extending tube which has a neck portion extending radially from an inner periphery thereof and defines an aperture in a center of said neck portion, said aperture sealed by a ball which is biased by a spring securely disposed in said pipe so as to prevent said grease from flowing back into said first recess of said base.

4. The grease pumping assembly as claimed in claim 1 wherein a cover is mounted to said drum to close said open top of said drum, said cover having at least one vent defined therein and having at least two first lugs extending radially from a periphery thereof, each one of said first lugs having at least one fourth hole defined therein, a support disk disposed between said drum and said base and said support disk engaged to said base by threadedly engaging bolts through said support disk and engaging to said base, said support disk having a second central hole defined in a center thereof which communicates with said first central hole and has at least two second lugs extending radially from a periphery thereof and each one of said second lugs has at least one fifth hole defined therein which is in alignment with said fourth hole, a first column and a second column each having first and second extending ends, each of said first and second extending ends of said first and said second columns having a smaller diameter than that of said first and said second columns, each of said first and second extending ends of said first column having a threaded recess defined longitudinally therein such that said first column is connected between said cover and said support disk by inserting each one of said two extending first and second ends into said corresponding fourth hole and said fifth hole respectively and threadedly engaging a bolt into each one of said threaded recesses of said first column, said second column having a threaded recess defined in said first extending end thereof which extends through said corresponding first lug of said cover and having a threaded portion defined in a periphery of the second extending end which extends through said corresponding second lug.

5. The grease pumping assembly as claimed in claim 4 wherein a pressing plate is disposed in said drum to press said grease in said drum.

6. The grease pumping assembly as claimed in claim 1 wherein one of said two second lugs has a threaded hole defined therein for a front wheel set being threadedly engaged thereto, said threaded portion of said second column threadedly engaged to a rear wheel frame, said rear wheel frame having an axle with a wheel disposed to each one of two ends thereof and a tube extending upwardly from said axle, said tube having a threaded recess defined in a top thereof for threadedly receiving said threaded portion of said second column therein.

\* \* \* \* \*